(12) United States Patent
Brenneman et al.

(10) Patent No.: US 8,880,908 B2
(45) Date of Patent: Nov. 4, 2014

(54) COMPUTING SYSTEM WITH POWER REQUIREMENT EVALUATION

(75) Inventors: Robert J. Brenneman, Poughkeepsie, NY (US); Eli M. Dow, Poughkeepsie, NY (US); William J. Huie, Poughkeepsie, NY (US); Sarah J. Sheppard, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 929 days.

(21) Appl. No.: 12/468,214

(22) Filed: May 19, 2009

(65) Prior Publication Data
US 2010/0299540 A1 Nov. 25, 2010

(51) Int. Cl.
*G06F 1/00* (2006.01)
*G06F 1/32* (2006.01)

(52) U.S. Cl.
CPC .................................. *G06F 1/3225* (2013.01)
USPC ........................................................ 713/300

(58) Field of Classification Search
USPC ........................................................ 713/300
See application file for complete search history.

(56) References Cited

U.S. PATENT DOCUMENTS

| | | | |
|---|---|---|---|
| 5,167,024 A | | 11/1992 | Smith et al. |
| 5,714,870 A * | | 2/1998 | Dunstan .......................... 713/321 |
| 6,167,524 A | | 12/2000 | Goodnow et al. |
| 6,710,578 B1 | | 3/2004 | Sklovsky |
| 6,922,788 B2 | | 7/2005 | Eberhard et al. |
| 7,019,739 B2 | | 3/2006 | Danis |
| 7,142,204 B2 | | 11/2006 | Shiotsu et al. |
| 7,178,743 B2 | | 2/2007 | Clarke, III et al. |
| 7,446,773 B1 * | | 11/2008 | Alben et al. ................... 345/502 |
| 2003/0079150 A1 * | | 4/2003 | Smith et al. .................... 713/320 |
| 2003/0126467 A1 | | 7/2003 | Noghanian et al. |
| 2004/0260957 A1 * | | 12/2004 | Jeddeloh et al. ............... 713/300 |
| 2005/0071697 A1 * | | 3/2005 | Batchelor et al. .............. 713/300 |
| 2006/0179334 A1 | | 8/2006 | Brittain et al. |
| 2008/0189567 A1 * | | 8/2008 | Goodnow et al. ............. 713/340 |
| 2009/0125744 A1 * | | 5/2009 | Goodnow et al. ............. 713/330 |
| 2009/0265519 A1 * | | 10/2009 | Moore et al. .................... 711/162 |
| 2010/0052421 A1 * | | 3/2010 | Schindler et al. ................ 307/35 |
| 2010/0257529 A1 * | | 10/2010 | Wilkerson et al. ............. 718/102 |
| 2011/0239013 A1 * | | 9/2011 | Muller ........................... 713/320 |
| 2012/0185706 A1 * | | 7/2012 | Sistla et al. .................... 713/300 |

OTHER PUBLICATIONS

International Search Report No. PCT/EP2010/056500 dated Aug. 17, 2010.

* cited by examiner

*Primary Examiner* — Nimesh G Patel
(74) *Attorney, Agent, or Firm* — Cantor Colburn LLP; Steven Chiu

(57) ABSTRACT

A computing system is provided and includes recording media relative to which input/output (I/O) operations are executable, and a processor, disposed in signal communication with the recording media, which is configured to execute the I/O operations and to evaluate power requirements associated with executions of the I/O operations relative to each individual recording medium. The processor includes a computer-readable medium having a set of instructions stored thereon, which, when executed, cause the processor to schedule the executions of the I/O operations relative to each individual recording medium or to refuse the executions of the I/O operations in accordance with the evaluated power requirements.

1 Claim, 4 Drawing Sheets

COMPUTING SYSTEM WITH POWER REQUIREMENT EVALUATION

BACKGROUND

Aspects of the present invention are directed to a computing system with power requirement evaluation.

Machines and computers, such as portable laptop computers, are often employed to execute input/output (I/O) operations, such as the burning of a CD or the writing of information to removable media. To be successfully executed, the I/O operation must be instantiated and fully conducted so as not to risk the loss of possibly important data. This requires a given amount of computing time, which is based on processing speeds and the size of the I/O operation, and the availability of sufficient power for powering the execution. The power can be provided by way of, e.g., a building's power supply when the machines and computers are plugged in or, in the case of the portable laptop computer which is not plugged into a power supply, a rechargeable battery.

If the portable laptop computer draws power from the rechargeable battery, the computer will only have access to a limited power reservoir. Over time, the amount of power within this power reservoir will decrease as the amount of available battery power dwindles. Eventually, the amount of available battery power will approach such a low level that warnings will be issued to the user to stop use and recharge. Nevertheless, in these cases, the user may persist in having his computer continue to perform I/O operations without regard to whether sufficient battery power will be available to complete the I/O operations. Thus, without further layers of protection, the user risks instantiating I/O operations without sufficient power and, therefore, the potential loss of data.

Enterprise computing systems, in which multiple possible remote servers communicate with multiple possible remote client computers, are not normally operated with battery power and are therefore not at risk of running out of power in the middle of an execution. These systems are generally coupled to one or more power grids and, as such, it is unlikely that the systems will ever lack sufficient power to complete I/O operations. With that said, costs associated with the use of the power by these systems can be significant. However, the systems do not typically consider such costs when undertaking I/O operations. Thus, a particular I/O operation may be completed using relatively expensive power even though the same I/O operation could have been conducted using cheaper power at a different time or at a remote location.

SUMMARY

In accordance with an aspect of the invention, a computing system is provided and includes recording media relative to which input/output (I/O) operations are executable, and a processor, disposed in signal communication with the recording media, which is configured to execute the I/O operations and to evaluate power requirements associated with executions of the I/O operations relative to each individual recording medium. The processor includes a computer-readable medium having a set of instructions stored thereon, which, when executed, cause the processor to schedule the executions of the I/O operations relative to each individual recording medium or to refuse the executions of the I/O operations in accordance with the evaluated power requirements.

In accordance with an aspect of the invention, a portable personal computer is provided and includes recording media relative to which input/output (I/O) operations are executable, a power source by which a quantity of power is made available for the executions of the I/O operations and a processor, disposed in signal communication with the recording media and the power source, which is configured to execute the I/O operations, to evaluate power requirements associated with executions of the I/O operations relative to each individual recording medium and to read the quantity of available power. The processor includes a computer-readable medium having a set of instructions stored thereon, which, when executed, cause the processor to schedule the executions of the I/O operations relative to each individual recording medium or to refuse the executions of the I/O operations in accordance with the evaluated power requirements and the quantity of available power.

In accordance with an aspect of the invention, a computer readable medium having instructions stored thereon, which, when executed cause a processor of a computing system, including recording media, to execute a method of controlling the computing system is provided. The method includes instantiating input/output (I/O) operations, reading power requirements for executions of the I/O operations with respect to the recording media and scheduling the executions of the I/O operations relative to each individual recording medium, or refusing the executions of the I/O operations in accordance with the evaluated power requirements.

BRIEF DESCRIPTIONS OF THE SEVERAL VIEWS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION

Figure 1:
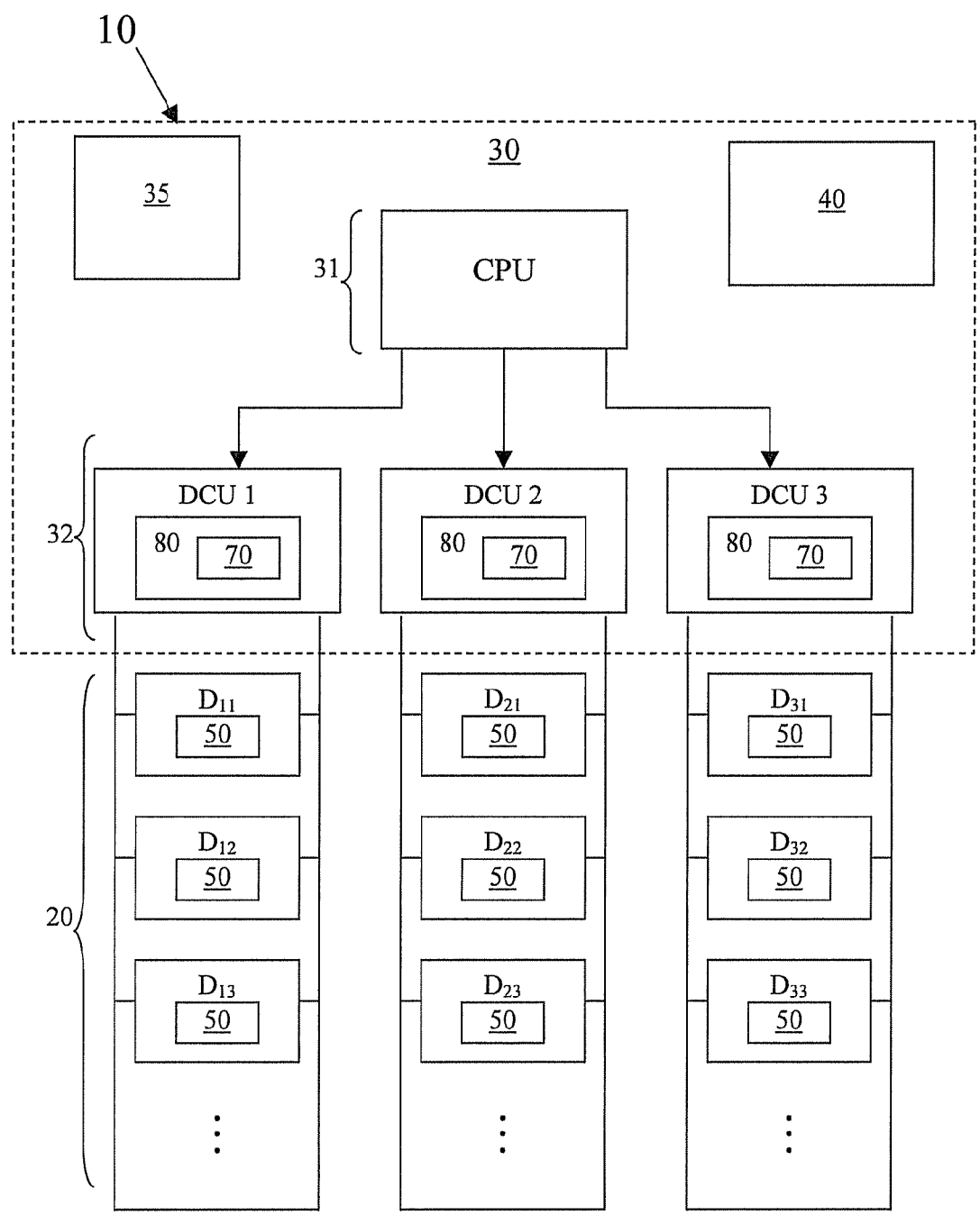
FIG. 1 is a schematic illustration of a computing system in accordance with embodiments of the invention.

With reference to FIG. 1, a computing system 10 is provided. The computing system 10 may be a personal computer or an enterprise computing system with multiple servers and client devices at possibly remote locations. The computing system 10 includes recording media 20, relative to which input/output (I/O) operations are executable, a processor 30 and, in some cases, a power source 40 by which a quantity of available power is provided for the executions of the I/O operations. The processor 30 is disposed in signal communication with the recording media 20 and is configured to execute the I/O operations and to evaluate power requirements associated with executions of the I/O operations relative to each individual recording medium 20. To this end, the processor 30 includes a memory unit 35. The memory unit 35 includes a computer-readable medium having a set of instructions stored thereon, which, when executed, cause the processor 30 to schedule the executions of the I/O operations relative to each individual recording medium 20 or to refuse the executions of the I/O operations in accordance with the evaluated power requirements.

As will be described below, the processor 30 may include multiple processing levels arranged in a tree format that includes a top level 31, at which a central processing unit (CPU) may reside, and a bottom level 32, at which one or more disk control units (DCU 1, DCU 2 and DCU 3) reside. Additional processing levels may, of course, be provided between the top and bottom levels 31 and 32. I/O operations are normally instantiated at the top level 31 as the CPU receives and interprets inputted read and write commands. The CPU then assigns the I/O operations downstream in accordance with read power requirements until they reach each of the various DCUs at the bottom level 32 as atomized I/O operations. Each of the atomized I/O operations is then carried out in accordance with read power requirements at a recording medium 20 coupled to an associated one of the DCUs.

The recording media 20 may include removable media that can be removably coupled to the computing system 10 or non-removable media that are normally coupled to the computing system 10. They may also include recording media, such as a universal serial bus (USB) flash drive, an optical disk, a DVD-ROM, etc., from which information is read or onto which information is written in accordance with the executions of the I/O operations. In any case, each recording medium 20 is provided with a power requirement gauge 50. The power requirement gauge 50 is readable by the processor 30 and provides an indication to the processor 30 as to how much power is required for an I/O operation to be executed with respect to the recording medium 20.

As shown in FIG. 1, each DCU is normally associated with a set of devices acting as recording media. Thus, DCU 1 is associated with devices $D_{11}$, $D_{12}$, $D_{13}$, . . . , in such a way as to allow DCU 1 to manage the executions of I/O operations of those devices and to read their respective power requirements indicated by their respective power requirement gauges 50. Similarly, DCU 2 is associated with devices $D_{21}$, $D_{22}$, $D_{23}$, . . . , in such a way as to allow DCU 2 to manage the executions of I/O operations of those devices and to read their respective power requirement gauges 50 and, finally, DCU 3 is associated with devices $D_{31}$, $D_{32}$, $D_{33}$, . . . , in such a way as to allow DCU 2 to manage the executions of I/O operations of those devices and to read their respective power requirement gauges 50.

Figure 2:
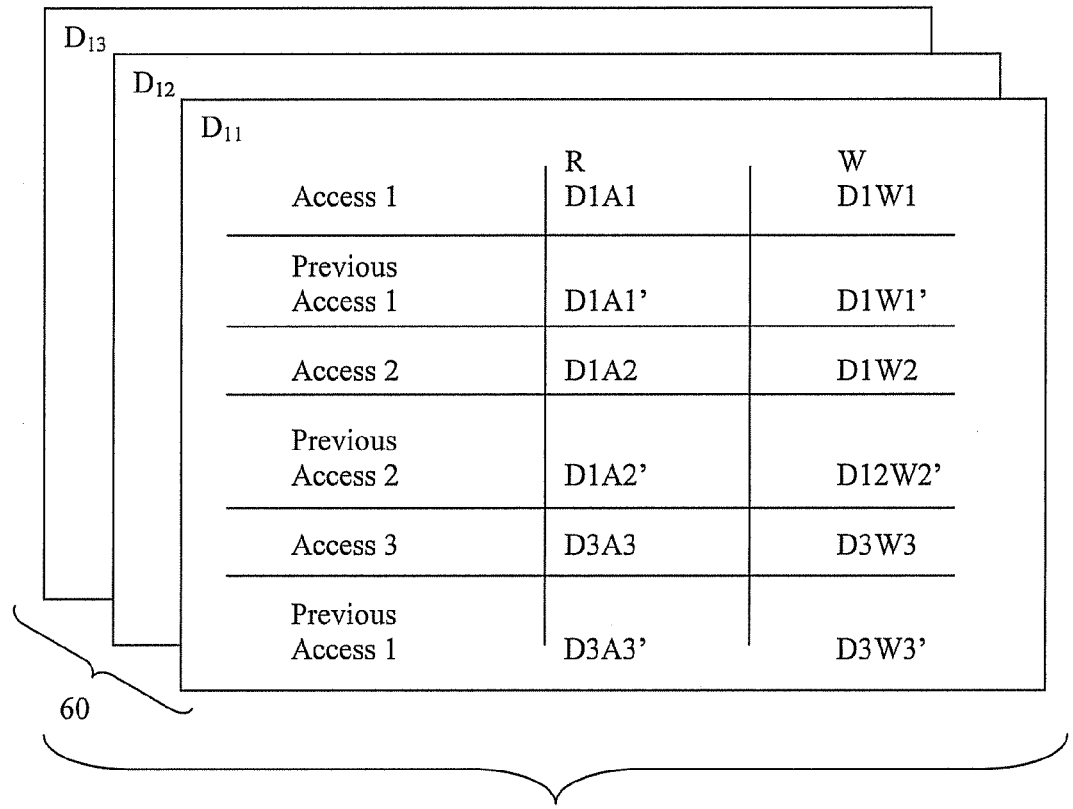
FIG. 2 is a schematic illustration of registers in use by the computing system of FIG. 1.

In accordance with an embodiment of the invention and, as shown in FIG. 2, the power requirement gauge 50 for each device may indicate the respective power requirement for executing an I/O operation of the device in the form of a register 60. That is, each register 60 may be configured to describe the power requirement for its device for each read (R) and each write (W) access incidence of any I/O operation executed with respect to the associated device. Thus, at a particular time, device $D_{11}$ requires D1A1 and D1W1 power for read and write operations of access 1, D1A2 and D1W2 power for read and write operations of access 2 and D1A3 and D1W3 power for read and write operations of access 3, and so on. Each register 60 may further be configured to indicate previous access data (i.e., D1A1', D1A2', etc.) that is periodically updated and reflective of power requirements of previous read and write access incidences.

The register 60 for each device is readable by the DCU to which that device is associated. Thus, DCU 1 reads the registers 60 of devices $D_{11}$, $D_{12}$ and $D_{13}$. Information gleaned from the registers 60 may then be compared with the quantity of power available for I/O operations (this being more important where the computing system 10 is being run with battery power) and is then employed by DCU 1 to schedule the executions of the I/O operations relative to devices $D_{11}$, $D_{12}$ and $D_{13}$ or to refuse the executions of the I/O operations in accordance with the quantity of available power.

In accordance with embodiments of the invention, if the DCU 1 compares the information gleaned from register 60 with the quantity of power available for I/O operations and the DCU 1 or the processor 30 subsequently determines that the quantity of power available may be insufficient for a given atomized I/O operation, the DCU 1 may either refuse the executions of the I/O operation, in which case DCUs 2 or 3 may take over, or warn the user before commencing with the I/O operation and only proceeding upon receipt of a user inputted command to do so. Similarly, if the DCU 1 subsequently determines that the quantity of power available for the I/O operation is so diminished that an execution of the I/O operation will definitely fail, the DCU 1 may simply refuse the execution without offering the user the opportunity to override that judgment.

If the user inputs the command to commence with the I/O operation, in accordance with further embodiments of the invention, the I/O operation could be conducted in such a manner as to increase the likelihood that the I/O operation could be relatively easily resumed once power is restored. As an example, while a file is written to device $D_{11}$ as part of the I/O operation, a counter of the offset could also be written to the file. Here, the write operation could be resumed from the last check-pointed location on device $D_{11}$ even after a complete power outage and restart.

In accordance with other embodiments of the inventions, if the DCU 1 determines that sufficient power for one or more atomized I/O operations is available, the DCU 1 schedules the executions of the I/O operations relative to devices $D_{11}$, $D_{12}$ and $D_{13}$. That is, the DCU 1 assigns the atomized I/O operations to any one or more of the devices in various combinations based upon the information gleaned from register 60 and predefined algorithms. For example, the DCU 1 could be configured to assign atomized I/O operations to the device that requires the least power for execution of the atomized I/O operations. Alternatively, the DCU 1 or the processor 30 could be configured to prioritize the atomized I/O operations with the DCU 1 being further configured to consider the power requirements and the priorities in assigning the atomized I/O operations.

Still further, the DCU 1 or the processor 30 may additionally analyze the previous access data and modify the assignments based on results of that analysis. That is, if the previous access data were found to be significantly different than the access data in a particular instance for device $D_{11}$, the DCU 1 may judge that the access data is unreliable and assign a pending I/O operation to another device even though the access data for the other device suggests that it is more power intensive than device $D_{11}$.

The information gleaned from register 60 of devices $D_{11}$, $D_{12}$ and $D_{13}$ is also aggregated at the DCU 1 register 70 where it can be stored, at least temporarily, in memory unit 80, which is disposed in relative association with the DCU 1. The DCU 1 register 70 includes information reflective of the total power requirement for access incidences of I/O operations for devices $D_{11}$, $D_{12}$ and $D_{13}$ along with information reflective of historical power requirements for devices $D_{11}$, $D_{12}$ and $D_{13}$. The DCU 1 register 70 along with registers for any other DCUs in computing system 10 can be transmitted to higher processing levels, such as top level 31, where additional I/O operation assignments can be made.

That is, with reference to FIG. 1, if processor 30 receives the DCU registers 70 from DCU 1, DCU 2 and DCU 3, the processor 30 can determine based on information gleaned from the DCU registers 70 and predefined algorithms which DCU and, by the same token, which recording media 20, will be best equipped to execute certain I/O operations. For example, if DCU 1 uses slightly less power than DCU 2 but DCU 1 and its associated recording media 20 are located in a region in which power is relatively very expensive, the processor 30 may assign I/O operations to DCU 2 to save costs.

Figure 3:
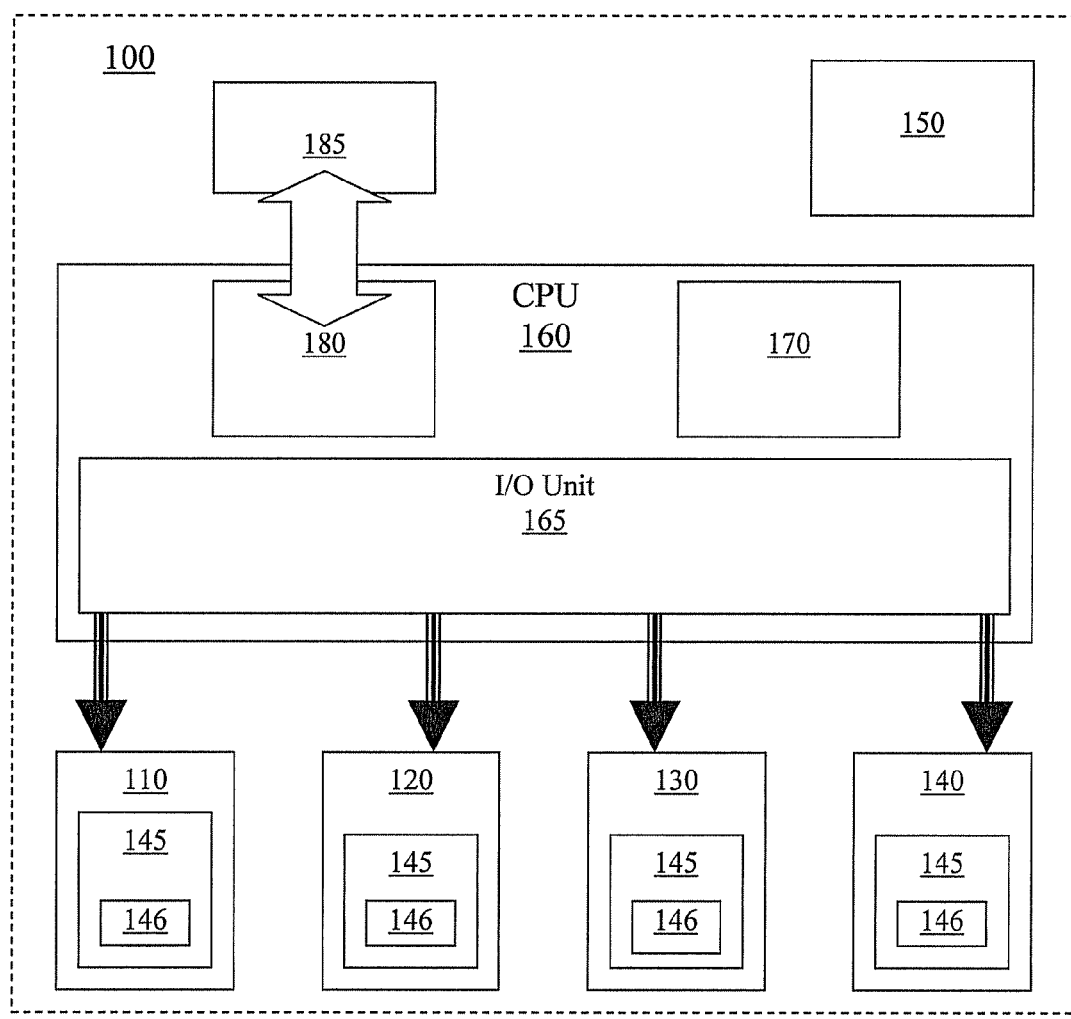
FIG. 3 is a schematic illustration of a personal computer in accordance with embodiments of the invention.

With reference to FIG. 3 and, in accordance with an aspect of the invention, a portable personal computer, such as a laptop 100, is provided. The laptop 100 may include removable and non-removable and fragmented and non-fragmented recording media, such as a universal serial bus (USB) flash drive 110, an optical disk drive 120, a DVD recorder 130 and a hard disk drive 140 relative to which input/output (I/O) operations are executable, a power source 150, such as a lithium-ion rechargeable battery, and a processor 160, such as a central processing unit (CPU). Each recording medium includes a power requirement gauge 145 and a register 146 that are configured in a similar manner as described above. The power source 150 is coupled to the recording media and the processor 160 and makes available a quantity of power to allow for the executions of the I/O operations.

The processor 160 is coupled to the power source 150 and includes an I/O unit 165, which is disposed in signal communication with the recording media. The processor 160 is thereby configured to execute the I/O operations by way of the I/O unit 165, to evaluate power requirements associated with executions of the I/O operations relative to each individual recording medium and to read the quantity of available power made available by the power source 150. To this end, the processor 160 includes a memory unit 170. The memory unit 170 may be a computer-readable medium having a set of instructions stored thereon. When executed, the instructions cause the processor 160 to schedule the executions of the I/O operations relative to each individual recording medium or to refuse the executions of the I/O operations in accordance with the evaluated power requirements and the quantity of available power.

Thus, as described above and, in accordance with an embodiment of the invention, if a user of the laptop 100 inputs a command to the processor 160 to, e.g., burn a DVD, the processor 160 may interrogate the power source 150 for a reading of the available power and, at the same time, the I/O unit 165 may read the power requirement from register 146 of the DVD recorder 130. If the available power is subsequently determined to be greater than the power requirement of the DVD recorder 130, the processor 160 executes the DVD burn command at the DVD recorder by way of the I/O unit 165. If, on the other hand, the available power is determined to be less than the power requirement, the processor 160 may simply refuse the execution or may issue a warning to the user as to the insufficient power situation by way of a display driver 180 and a display unit 185. If the user chooses to proceed, the processor 160 may then execute the DVD burn command by way of the I/O unit 165 in such a manner as to allow the command to be resumed if a power outage occurs before completion, as described above.

As described above, register 146 may include current power requirement data and historical power requirement data, which is periodically updated. In this way, the laptop 100 can adjust the determinations of whether sufficient power will be available for certain I/O operations over time. This can be particularly relevant where the recording medium being read from or written to is fragmented. In this case, the power requirement for similar I/O operations with respect to that recording medium will increase over time. As such, the processor 160 will consider the historical power requirement data of register 146 to judge whether the current power requirement data is reliable or not.

In an alternate embodiment, the I/O unit 165 may also read the power requirements of recording media that are reasonably analogous to the DVD recorder 130, such as the USB flash drive 110, to determine whether the DVD burn command can be executed with respect to another device with a lower power requirement. In this case, if the USB flash drive 110 is found to have a lower power requirement than the DVD recorder 130 and the quantity of available power from the power source 150, the processor 160 may suggest copying the data that was to be burned to the DVD onto the USB flash drive 110. If the user chooses this option, the processor 160 executes the copy command with respect to the USB flash drive by way of the I/O unit 165.

Figure 4:
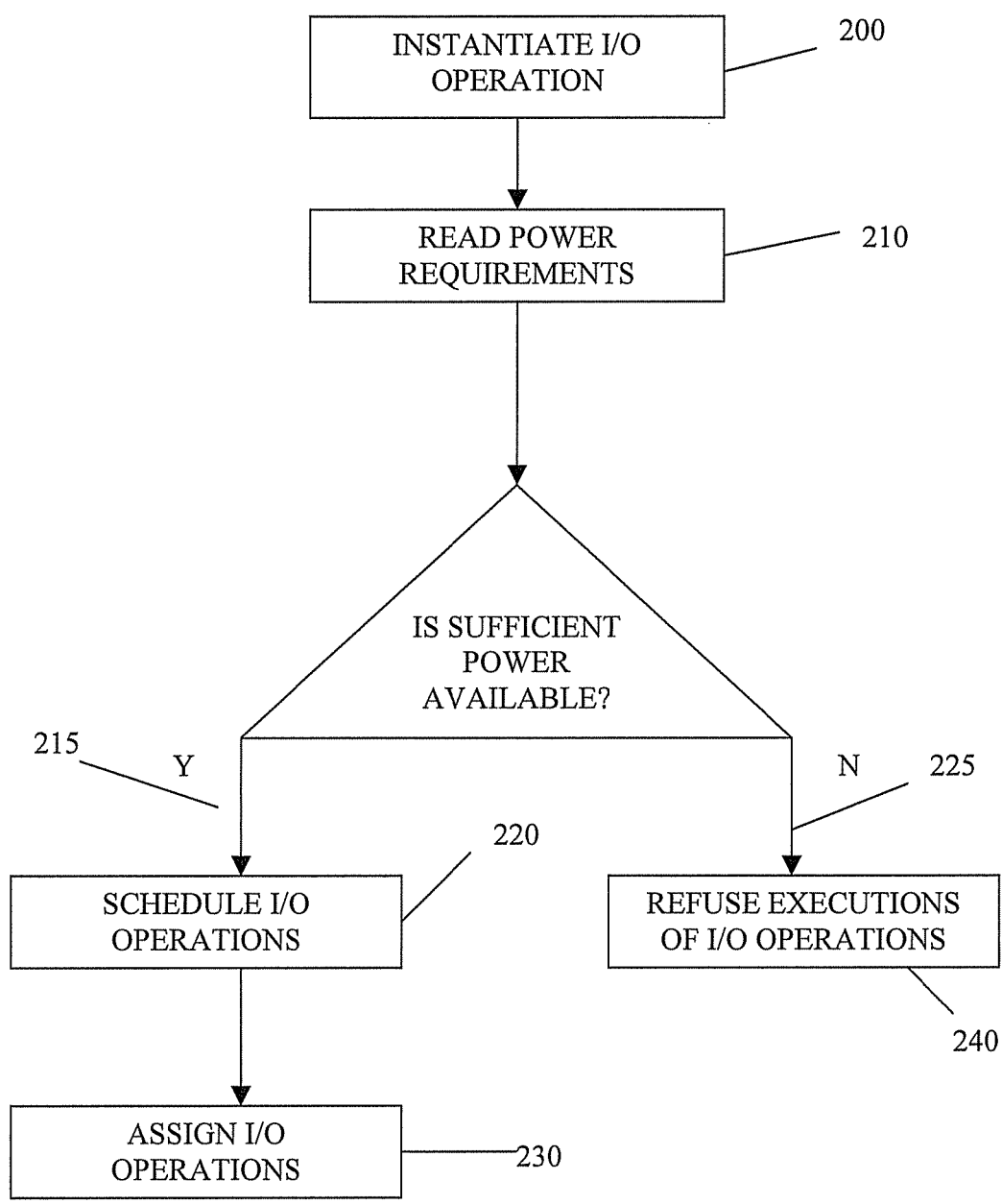
FIG. 4 is a flow diagram illustrating a method of controlling a computing system in accordance with embodiments of the invention.

With reference to FIG. 4 and, in accordance with another aspect of the invention, a computer readable medium is provided. The computer readable medium has instructions stored thereon, which, when executed cause a processor of a computing system, including recording media, to execute a method of controlling the computing system. The method includes instantiating input/output (I/O) operations 200, reading power requirements for executions of the I/O operations with respect to the recording media 210, and, if sufficient power is available 215, scheduling the executions of the I/O operations relative to each individual recording medium 220 to occur immediately or following a delay, or, if sufficient power is unavailable 225, refusing the executions of the I/O operations in accordance with the evaluated power requirements 230 and, in some cases, in accordance with priorities of the executions. Where the executions are scheduled to occur, the method may further include assigning the executions to particular recording media 240.

A collection of processors configured as described previously, can collectively be managed by yet another layer of systems management. Just as in the case where a single processor, with a collection of DCUs attached may observe the relative power requirements to drive I/O for each DCU and make I/O Scheduling decisions according to that data, so too can a workload management system observe the relative power requirements for scheduling a workload across multiple processors and schedule work to run on the most power efficient processor, or the processor with the lowest power cost per unit of work. Additionally, given that the workload manager knows the power cost of each application running across all the processors in the environment, it may elect to stop low priority applications on several processors to lower the overall power consumption of the collection of processors such that the total power consumed by the collection of processors is below a threshold value.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A computing system for assuring completion of I/O operations when power available to the system is deteriorating, the system comprising:

a processor configured to communicate with recording media, the processor configured to perform a method comprising:

in a first stage of operation, receiving, by the processor, requests to execute I/O operations, executing requested I/O operations to each recording medium of said recording media and determining power consumption associated with executions of the I/O operations of each recording medium; and in a second stage of operation, receiving, by the processor, a request to execute an I/O operation to a respective recording medium;

interrogating, by the processor, a power source for a reading of a quantity of available power at the power source;

determining, by the processor, the current amount of available power as a result of the interrogating and determining an amount of power required to complete the I/O operation at the respective recording medium based on the determined power consumption associated with executions of the I/O operations of each recording medium;

executing the requested I/O operations to the respective recording medium based on the determined amount of power required to complete the I/O operation at the respective recording medium being less than the determined current amount of available power at the power source;

blocking execution of the requested I/O operation to the respective recording medium based on the determined amount of power required to complete the I/O operation at the respective recording medium being greater than the determined current amount of available power at the power source whereby the current amount of available power at the power source is insufficient to complete the I/O operation at the respective recording medium; and commencing execution of a blocked I/O operation responsive to a user command where the I/O operation comprises an incidence of a write access of a file, the commencing comprising writing a counter to the file, restoring power following a complete power outage and, in an event the writing was incomplete at the instance of the complete power outage, resuming the writing in accordance with the counter.

\* \* \* \* \*